United States Patent [19]
Wen et al.

[11] Patent Number: 6,159,639
[45] Date of Patent: Dec. 12, 2000

[54] TRIPLE-POLYMER BASED COMPOSITE ELECTROLYTE

[76] Inventors: Ten-Chin Wen, No. 1, Ta Hsueh Rd., Tainan; Tsung-Tien Cheng, No. 357, Ta Feng First Rd., San-Ming District, Kaohsiung; Han-Cheng Kuo, No. 8-2, Shih Gu Liao, Gau Ping Tsuen, Long Tan Hsiang, Taoyuan Hsien, all of Taiwan

[21] Appl. No.: 09/082,740

[22] Filed: May 21, 1998

Related U.S. Application Data

[63] Continuation-in-part of application No. 08/980,990, Dec. 1, 1997, Pat. No. 6,077,897.
[51] Int. Cl.$^7$ .............................. H01M 6/16; H01M 6/14
[52] U.S. Cl. ............................................ 429/309; 429/324
[58] Field of Search ..................................... 429/192, 194, 429/199, 190, 195

[56] References Cited

U.S. PATENT DOCUMENTS

| | | | |
|---|---|---|---|
| 5,479,278 | 12/1995 | Takauchi et al. | 359/52 |
| 5,843,332 | 12/1998 | Takeuchi et al. | 252/299.01 |
| 5,912,093 | 6/1999 | Wen et al. | 429/192 |

*Primary Examiner*—Yogendra Gupta
*Assistant Examiner*—John M Petruncio
*Attorney, Agent, or Firm*—Madson & Metcalf

[57] ABSTRACT

A WPU(PEG)-WPU(PTMG)-PEO triple-polymer based composite electrolyte is disclosed. The electrolyte includes a thin composite film and an anhydrous liquid electrolyte within the thin film. The thin film is composed of WPU (PTMG) serving as a support, PEO serving as an adsorbent of the liquid electrolytes, and WPU(PEG) serving as a compatibility promoter. On the other hand, the anhydrous liquid electrolyte is used for ionic conduction. The resulting thin film electrolyte has a good conductivity (up to $10^{-2} \sim 10^{-3}$ S/cm at room temperature), especially within a compositional range of 0~75 wt. % WPU(PEG), 0~45 wt. % WPU(PTMG), and 20~95 wt. % PEO. A WPU(PEG)-WPU (PTMG)-PEO based composite electrolyte is adapted to be used in lithium ion batteries, lithium batteries, and electrochromic devices.

7 Claims, 4 Drawing Sheets

TRIPLE-POLYMER BASED COMPOSITE ELECTROLYTE

The present invention is a continuation-in-part application of the parent application bearing Ser. No. 08/980,990 and filed on Dec. 1, 1997 now U.S. Pat. No. 6,077,897.

FIELD OF THE INVENTION

The present invention is related to a polymeric electrolyte, and more particularly, to a triple-polymer based composite electrolyte consisting of polyethylene glycol based waterborne polyurethane (WPU(PEG)), polytetramethylene glycol based waterborne polyurethane (WPU(PTMG)), polyethylene oxide (PEO), and liquid electrolytes. Also, the present invention is related to the use of WPU(PEG)-WPU(PTMG)-PEO based composite electrolytes in lithium ion batteries, lithium batteries, electrochromic devices, and other fields for ionic conduction.

BACKGROUND OF THE INVENTION

A polymeric solid electrolyte is a kind of polymeric thin film performing ion conduction rather than electron conduction. The polymeric solid electrolyte is adapted to be used in a series of primary and secondary lithium batteries or lithium-ion batteries to thin the batteries in shape. The thinned batteries can also be further processed into windable batteries, bipolar stack batteries, thin-film batteries, etc., according to various requirements. In addition, the use of polymeric solid electrolytes in the batteries can overcome the problems of difficult package and current leakage encountered by general batteries with liquid electrolyte.

In earlier stage, the research on polymeric solid electrolytes is focused on the complex film of polyethylene oxide (PEO) based material and a lithium salt. The material has a relatively low conductivity, as low as $10^{-7} \sim 10^{-8}$ S/cm at room temperature, so that the material works only at high temperature such as 80° C. or above. Furthermore, a lot of organic solvent which is detrimental to the industrial security and the environmental protection is used and then evaporated in the process for producing the polyethylene oxide based thin film.

In recent years, gel electrolytes, such as polyacrylonitrile (PAN) based electrolytes, have been reported to be used in cells, and the product has a practically desired level of conductivity at room temperature. Nevertheless, the film has to be produced in a glove box or dry room so that the manufacturing process will be built with high cost.

In addition, B. J. Bauer et al. claimed in U.S. Pat. No. 4,654,279 that a two phase interpenetrating network of a mechanical supporting phase of a continuous network of a crosslinked polymer and an ionic conducting phase comprising a metal salt complexing liquid polymer. The conductivities of these polymeric electrolytes are constrained by the characteristics of liquid polymer, which are approximating $10^{-4}$ S/cm, too low to be used in lithium batteries.

On the other hand, in the parent application, a composite electrolyte based on a WPU-PEO film containing therein an organic liquid electrolyte is disclosed. The material WPU in the invention plays the role of a mechanical supporting matrix, and the material PEO functions as an electrolyte absorbent. The conductivity of these electrolytes can be promoted to $\sim 10^{-3}$ S cm$^{-1}$ at room temperature.

SUMMARY OF THE INVENTION

Therefore, an objective of the present invention is to provide a triple-polymer based composite electrolyte, which exhibits a satisfactory conductivity up to $10^{-2} \sim 10^{-3}$ S/cm at room temperature for lithium batteries.

Another objective of the present invention is to provide a triple-polymer based composite electrolyte, which has good mechanical strength as well as high conductivity.

A further objective of the present invention is to provide a triple-polymer based composite electrolyte, which uses a further component to promote compatibility, compared to the parent application, so that the compositions of the three polymers are not required to be precisely controlled during manufacturing.

Still another object of the present invention is to provide a triple-polymer based composite electrolyte, which can be carried out in the presence of an extremely small amount of organic solvent so that the is problems in industrial security and environmental protection during the process can be solved.

A further object of the present invention is to provide a triple-polymer based composite electrolyte, which can be used in cells, thereby thinning the cells in shape and allowing the cells to be further processed as desired.

A first aspect of the present invention is related to a triple-polymer based composite electrolyte. The electrolyte includes a thin composite film of a WPU(PEG)-WPU(PTMG)-PEO mixture serving as a matrix of said composite electrolyte; and an anhydrous liquid electrolyte arranged in said matrix for ion conduction.

Although not critical, the proportional ranges of WPU(PEG), WPU(PTMG), and PEO in the WPU(PEG)-WPU(PTMG)-PEO mixture are preferably 0~75 wt. %, 0~45 wt. %, and 20~95 wt. %, respectively.

On the other hand, the liquid electrolyte preferably includes a lithium salt selected from a group consisted of $LiCF_3SO_3$, $LiClO_4$, $LiPF_6$, $LiBF_4$, $LiAsF_6$, $LiN(CF_3SO_2)_3$, and a mixture thereof; and a solvent selected from group consisted of propylene carbonate, ethylene carbonate, diethyl carbonate, dimethyl carbonate, ethyl methyl carbonate, diethyl ether, γ-butyrolactone, 2-methyl-tetrahydrofuran, 1,2-dimethoxyethane, tetrahydrofuran, N-methyl-2-pyrrolidone, dioxolane, and a mixture thereof.

A second aspect of the present invention is related to the use of a WPU(PEG)-WPU(PTMG)-PEO based composite electrolyte in an electrochemical cell. The present electrolyte is used with a cathode-electrode capable of intercalating lithium, and a counter-electrode capable of supplying lithium.

A third aspect of the present invention is related to the use of a WPU(PEG)-WPU(PTMG)-PEO based composite electrolyte in an electrochromic devices. The electrolyte according to the present invention is used as an intermediate between electrochomic materials.

BRIEF DESCRIPTION OF THE DRAWING

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

As described above, the WPU(PEG)-WPU(PTMG)-PEO based composite electrolyte according to the present invention is a composite electrolyte including a thin film matrix formed of three polymers, i.e. polyethylene glycol based waterborne polyurethane (WPU(PEG)), polytetramethylene glycol based waterborne polyurethane (WPU(PTMG)), polyethylene oxide (PEO), and at least a liquid electrolyte within the matrix. Examples are now given to illustrate the manufacturing process of a WPU(PEG)-WPU(PTMG)-PEO based composite electrolyte according to the present invention. Herein, the polymer WPU(PEG) is a waterborne polyurethane containing polyethylene glycol as a soft segment, and the polymer WPU(PTMG) is a waterborne polyurethane containing polytetramethylene glycol as a soft segment. It should be noted that the examples are only given for illustrative purposes rather than limiting the scope of the present invention.

EXAMPLE 1

88 g of PTMG, 32 g of IPDI and 1.2 g of DMPA are mixed and reacted in a reactor under nitrogen atmosphere with stirring to form a prepolymer. Add acetone and lithium diaminosulfonate to the prepolymer, then drop pure water to the system, and then recover acetone under reduced pressure and heat to form a waterborne WPU(PTMG) dispersion solution.

88 g of PEG, 32 g of IPDI and 1.2 g of DMPA are mixed and reacted in a reactor under nitrogen atmosphere with stirring to form a prepolymer. Add acetone and lithium diaminosulfonate to the prepolymer, then drop pure water to the system, and then recover acetone under reduced pressure and heat to form a waterborne WPU(PEG) dispersion solution.

Mix WPU(PEG) and WPU(PTMG) dispersions (about 30% solid) with a PEO aqueous solution to form a uniform solution with the desired solid composition. The composition can be ranged within 0~75 wt. % WPU(PEG), 0~45 wt. % WPU(PTMG), and 20~95 wt. % PEO, which is not critical. Then cast and dry the resulting solution to form a WPU(PEG)-WPU(PTMG)-PEO composite film.

EXAMPLE 2

Figure 1A:
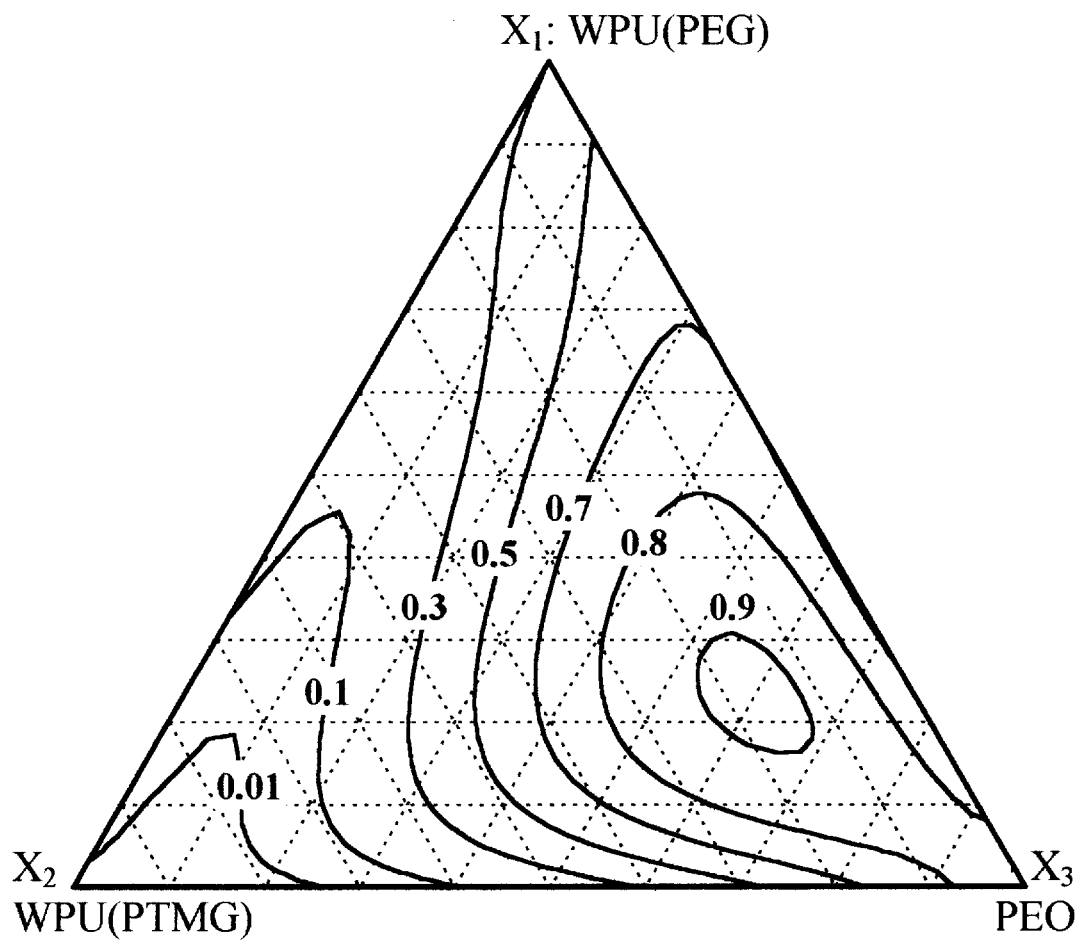
FIGS. 1A~1C are contour plots showing the conductivity variations of a triple-polymer based composite electrolyte according to the present invention with the compositions of the three polymer components at temperatures of 5° C., 25° C. and 45° C., respectively.
Figure 1B:
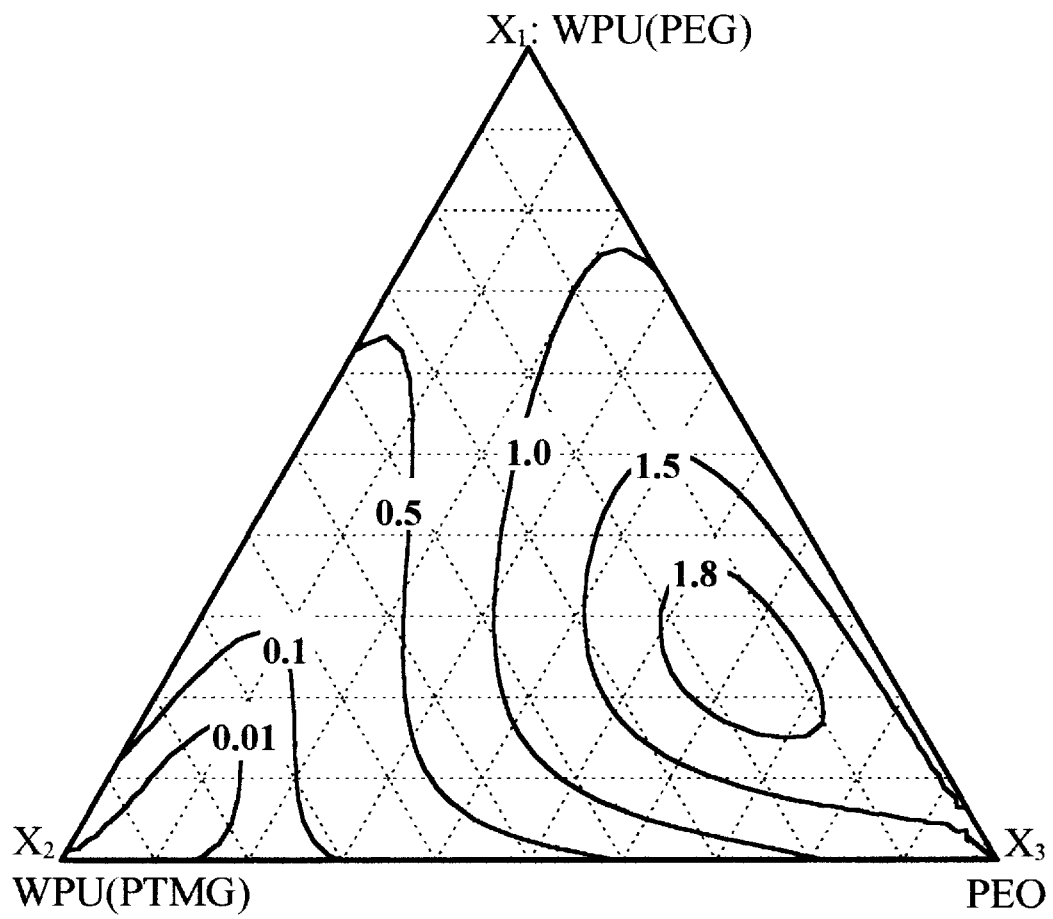
Figure 1C:
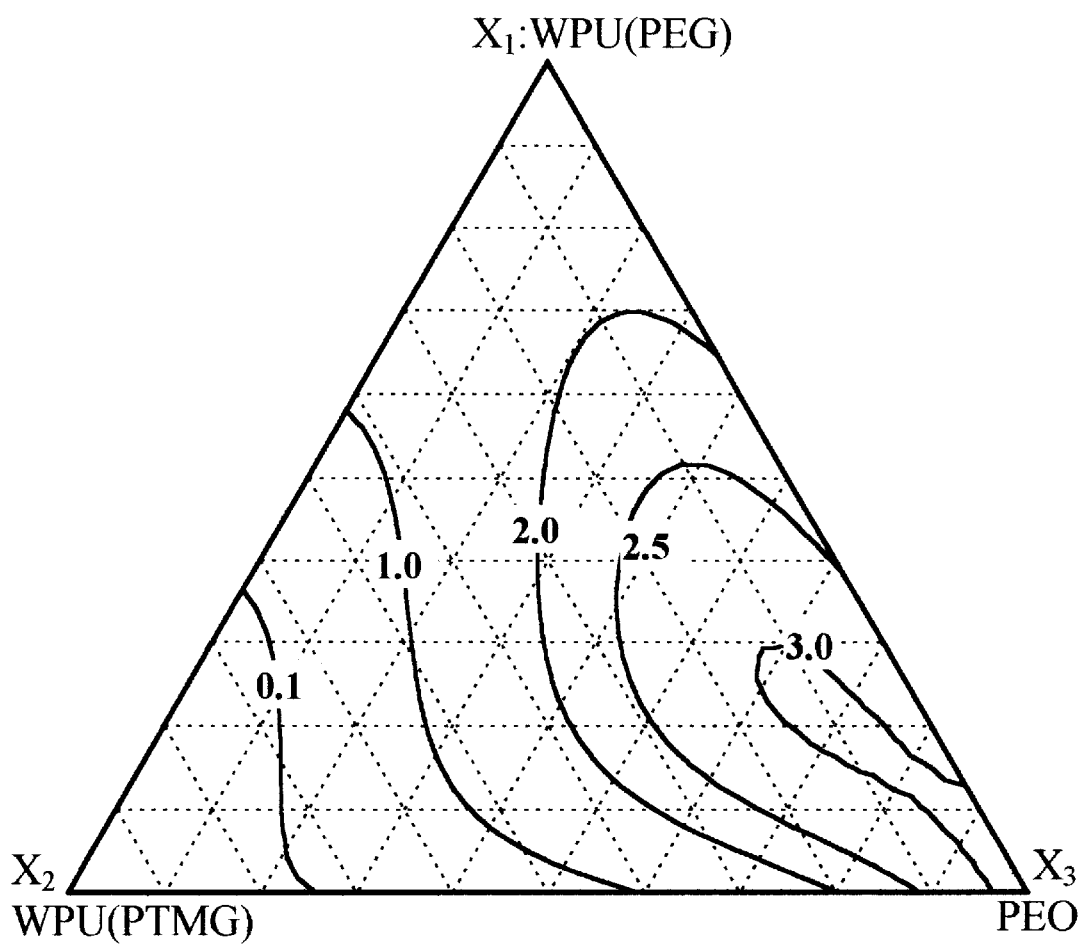

Swell the dried WPU(PEG)-WPU(PTMG)-PEO composite film with an anhydrous solution of 1M $LiCF_3SO_3$/PC in a glove box for three minutes to obtain a WPU(PEG)-WPU (PTMG)-PEO based composite electrolyte. The contour plots of the conductivity of the electrolytes having various WPU(PEG)/WPU(PTMG)/PEO compositions at 5° C., 25° C., and 45° C. are shown in FIGS. 1A~1C, respectively.

EXAMPLE 3

Figure 2:
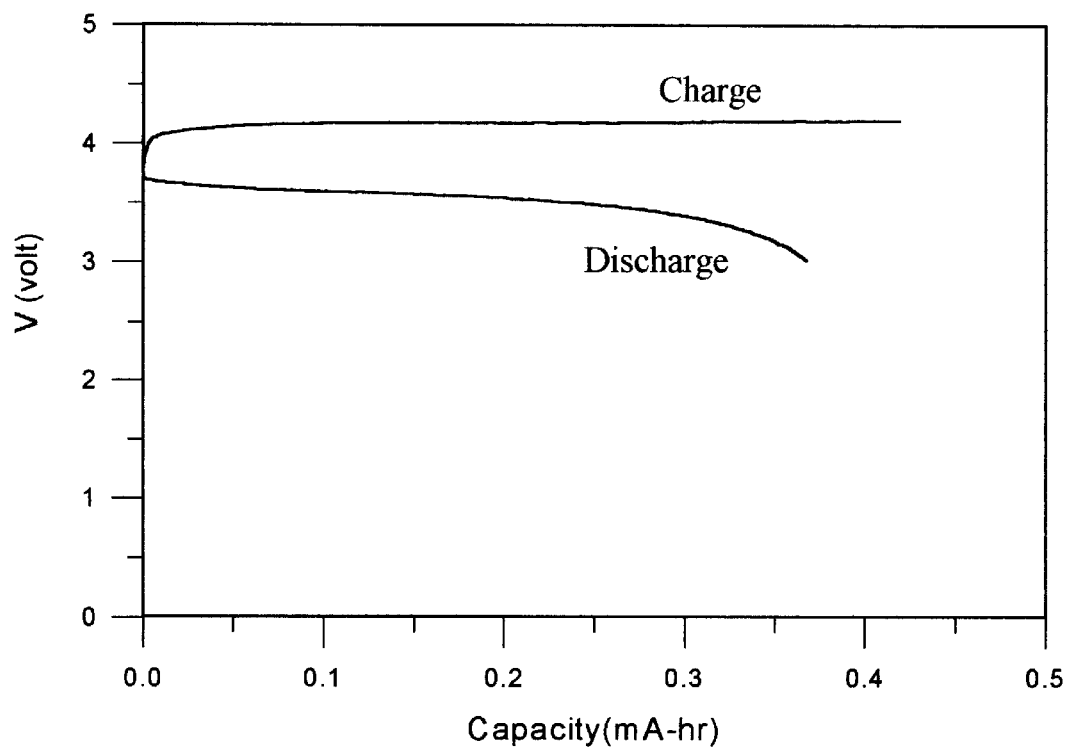
FIG. 2 is a plot showing a charge/discharge profile of a lithium cell using a triple-polymer based composite electrolyte according to the present invention.

Use a WPU(PEG)-WPU(PTMG)-PEO thin film of Example 1 having a composition of WPU(PEG):WPU (PTMG):PEO=15:25:60 in weight, and an anhydrous liquid electrolyte of Example 2, i.e. 60% $LiCF_3SO_3$/PC, to assemble a Li/$LiCoO_2$ film-type cell. Charge/discharge this cell with 0.02 mA/$cm^2$ between 4.2V and 3.0V to inspect the charge/discharge status of the cell. The resulting charge/discharge profiles are shown in FIG. 2.

According to the above embodiments and tests, a thin film electrolyte having a proper WPU(PEG)/WPU(PTMG)/PEO composition can be produced according to desired conductivity.

Compared to the conventional organic electrolytic solution, the present composite electrolyte is suitable for manufacturing a thin film cell, a bipolar stack cell or secondary lithium cell.

Compared to the solid electrolyte having no solvent therein, such as polyethylene oxide (PEO) or poly (methoxyethoxy ethoxyphosphazene) (MEEP)-based electrolyte, the present composite electrolyte has high conductivity ($10^{-2}$~$10^{-3}$ S/cm at room temperature) and proper mechanical toughness. In addition, during the casting process to form a dried composite film according to the present invention, no industrial security and environmental protection problems resulting from the evaporation of organic solvent are caused because water is the major solvent in the dispersion solution. Further, the present electrolyte performs well at various temperature.

Compared to the conventional gel electrolyte such as polyacrylonitrile (PAN) based electrolyte, the process for forming the present composite electrolyte is easy and suitable for mass production.

Compared to dual-phase composite electrolytes of the parent invention, the present invention is easier for quality control in manufacturing because the process for forming the present composite electrolyte can be performed in a wider compositional range without influencing the practical conductivity and strength. The process for preparing the WPU(PEG)-WPU(PTMG)-PEO composite film according to the present invention has advantages of being able to be carried out in air, no difficulty in the treatment of organic solvent, and minimizing the requirement for operation in an oven or a glove box. The final product, the composite electrolyte, can be applied to a series of lithium cells at various temperatures, e.g. from 5° C. to 90° C., depending on the formulation of the polymeric matrix. Moreover, the present electrolyte is also suitable for an electrochromic device owing to the excellent transparency thereof.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A triple-polymer based composite electrolyte, comprising:
    a thin composite film of a triple-polymer mixture serving as a matrix of said composite electrolyte, said triple-polymer mixture comprising a positive amount of waterborne polyurethane containing polyethylene glycol as a soft segment (WPU(PEG)), a positive amount of waterborne polyurethane containing polytetramethylene glycol as a soft segment (WPU(PTMG)), and a positive amount of polyethylene oxide (PEO); and
    an anhydrous liquid electrolyte arranged in said matrix for ion conduction.

2. The triple-polymer based composite electrolyte according to claim 1 wherein said liquid electrolyte includes a lithium salt selected from the group consisting of $LiCF_3SO_3$, $LiClO_4$, $LiPF_6$, $LiBF_4$, $LiAsF_6$, $LiN(CF_3SO_2)_3$, and a mixture thereof.

3. The triple-polymer based composite electrolyte according to claim 1 wherein said liquid electrolyte includes a solvent selected from the group consisting of propylene carbonate, ethylene carbonate, diethyl carbonate, dimethyl carbonate, diethyl ether, γ-butyrolactone, 2-methyltetrahydrofuran, 1,2-dimethoxyethane, tetrahydrofuran, ethyl methyl carbonate, N-methyl-2-pyrrolidone, dioxolane, and a mixture thereof.

4. The triple-polymer based composite electrolyte according to claim 1 wherein the triple-polymer mixture contains up to 75 wt. % WPU(PEG).

5. The triple-polymer based composite electrolyte according to claim 1 wherein the triple-polymer mixture contains up to 45 wt. % WPU(PTMG).

6. The triple-polymer based composite electrolyte according to claim 1 wherein the triple-polymer mixture contains from 20 to 95 wt. % PEO.

7. The triple-polymer based composite electrolyte according to claim 1 wherein the triple-polymer mixture contains up to 75 wt. % WPU(PEG), up to 45 wt. % WPU(PTMG), and from 20 to 95 wt. % PEO.

* * * * *